United States Patent
Bowman et al.

(10) Patent No.: US 10,657,219 B2
(45) Date of Patent: May 19, 2020

(54) COLLABORATIVE EDITING OF MANUFACTURING DRAWINGS

(71) Applicant: Brigham Young University, Provo, UT (US)

(72) Inventors: Kelly Eric Bowman, Provo, UT (US); Spencer Carter, Provo, UT (US); Scott Jackson, Everett, WA (US); Jessica Collyer, Binghamton, NY (US); Scott Christensen, Provo, UT (US); Abigail Christensen, Provo, UT (US); Joanna Hugo, Mililan, HI (US); Jacob Wardell, Tucson, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 15/960,282

(22) Filed: Apr. 23, 2018

(65) Prior Publication Data
US 2018/0307794 A1     Oct. 25, 2018

Related U.S. Application Data

(60) Provisional application No. 62/488,146, filed on Apr. 21, 2017, provisional application No. 62/488,154, filed on Apr. 21, 2017.

(51) Int. Cl.
*G06F 17/50* (2006.01)
*G06Q 10/10* (2012.01)
(Continued)

(52) U.S. Cl.
CPC .......... *G06F 17/5086* (2013.01); *G06F 17/50* (2013.01); *G06Q 10/101* (2013.01);
(Continued)

(58) Field of Classification Search
None
See application file for complete search history.

(56) References Cited

U.S. PATENT DOCUMENTS 7,062,722 B1     6/2006   Carlin et al.
8,898,693 B2    11/2014   Kenagy et al.
(Continued)

OTHER PUBLICATIONS

D. Hekmatzada et al. "Non-Photorealistic Rendering of Complex 3D Models on Mobile Devices", 8th Annual Conference of the International Association for Mathematical Geology, pp. 93-98, Sep. 2002.

*Primary Examiner* — Jeffrey J Chow
(74) *Attorney, Agent, or Firm* — Kunzler Bean & Adamson

(57) ABSTRACT

A method, executed by at least one processor, may include executing a first CAx application configured to enable a first user to edit a first 3D proprietary model comprising a plurality of features for a part that is to be manufactured, wherein the first 3D proprietary model is encoded in a first CAx format. The method may also include, executing a synchronization plugin module for the first CAx application and detecting, with the synchronization plugin module, a request by the first user to generate a first 2D manufacturing drawing and model corresponding to a selected view of the part that is to be manufactured. The method may also include initiating generation of a 2D collaborative model corresponding to the first 2D manufacturing model and initiating storage of the 2D collaborative model on a collaborative data store. A corresponding system and computer readable medium are also disclosed herein.

22 Claims, 5 Drawing Sheets

(51) Int. Cl.
  *G06T 19/20* (2011.01)
  *H04L 29/08* (2006.01)
(52) U.S. Cl.
  CPC .......... *G06T 19/20* (2013.01); *G06F 2217/04* (2013.01); *G06F 2217/12* (2013.01); *H04L 67/1095* (2013.01); *H04L 67/12* (2013.01); *H04L 67/2895* (2013.01)

(56) References Cited

U.S. PATENT DOCUMENTS

| | | | |
|---|---|---|---|
| 9,310,984 B2 | 4/2016 | Kim | |
| 2006/0106476 A1* | 5/2006 | Tornquist | G05B 19/4067 700/98 |
| 2007/0146362 A1* | 6/2007 | Yanagishita | G06F 17/50 345/420 |
| 2007/0165021 A1* | 7/2007 | Hanke | G06T 19/00 345/419 |
| 2012/0109592 A1* | 5/2012 | Potter | G06F 17/50 703/1 |
| 2013/0144566 A1* | 6/2013 | De Biswas | G06T 17/005 703/1 |
| 2014/0317531 A1* | 10/2014 | Bowman, Jr. | H04L 65/403 715/751 |
| 2015/0268058 A1* | 9/2015 | Samarasekera | G06K 9/00637 701/409 |
| 2016/0021183 A1* | 1/2016 | Bowman | G06F 16/955 709/204 |
| 2017/0148227 A1* | 5/2017 | Alsaffar | G06T 11/20 |

\* cited by examiner

COLLABORATIVE EDITING OF MANUFACTURING DRAWINGS

RELATED APPLICATIONS

This application claims the benefit of U.S. Provisional Patent Application 62/488,146 entitled "INTEROPERABLE 2D AND 3D DRAWING ANNOTATIONS FOR DESIGN REVIEWS USING A WEB BASED SERVER" and filed on 21 Apr. 2017 and of U.S. Provisional Patent Application 62/488,154 entitled "3D DRAWINGS INTEROP AND MULTI-USER" and filed on 21 Apr. 2017. Each of the above applications are incorporated herein by reference.

BACKGROUND

The claimed invention relates to computer aided technologies (CAx) such as computer aided design, engineering, analysis, and manufacture in general; and apparatus, systems, means, and methods for collaborative CAx editing in particular.

Large design and engineering projects require coordination of the efforts of many designers or engineers. Designers and engineers may have various CAx tools that they have experience with, have been trained to use, or simply prefer. Existing CAx data may have been created using still other CAx tools. Each of these CAx tools may have incompatible file formats. In particular, existing CAx systems, are not well-suited to collaborative design and editing of 2D manufacturing drawings.

SUMMARY OF THE INVENTION

A system may include a collaborative data store configured to store a 3D collaborative model comprising a plurality of features for a part that is to be manufactured, wherein the 3D collaborative model is encoded in a collaborative server format. The system may also include a collaborative server configured to manage the collaborative data store. The system may also include a first computer aided technology (CAx) client comprising at least one processor and configured to execute a first CAx application and enable a first user to edit a first 3D proprietary model wherein the first 3D proprietary model is encoded in a first CAx format that is different than the collaborative server format. The system may also include a second computer aided technology (CAx) client comprising at least one processor and configured to execute a second CAx application and enable a second user to edit a second 3D proprietary model wherein the second 3D proprietary model is encoded in a second CAx format that is different than the first CAx format and the collaborative server format.

The system may further include one or more synchronization modules associated with at least one of the first CAx client, the second CAx client, and the collaborative server. The one or more synchronization modules may be configured to synchronize the collaborative model with the first 3D proprietary model in response to updates to at least one of the first 3D proprietary model, the second 3D proprietary model, and the 3D collaborative model. The one or more synchronization modules may be further configured to detect a request from the first user to generate a first 2D manufacturing drawing and model corresponding to a selected view of the part that is to be manufactured. Furthermore, the one or more synchronization modules may be further configured to generate a 2D collaborative model corresponding to the 2D manufacturing model and initiate storage of the 2D collaborative model on the collaborative data store. The one or more synchronization modules may also be configured to generate a second 2D manufacturing model corresponding to the first 2D manufacturing model on the second CAx client, detect changes to the first 2D manufacturing model and propagate the changes to the 2D collaborative model and the second 2D manufacturing model.

A corresponding method, executed by at least one processor, may include executing a first CAx application configured to enable a first user to edit a first 3D proprietary model comprising a plurality of features for a part that is to be manufactured, wherein the first 3D proprietary model is encoded in a first CAx format. The method may also include executing a synchronization plugin module for the first CAx application and detecting, with the synchronization plugin module, a request by the first user to generate a first 2D manufacturing drawing and model corresponding to a selected view of the part that is to be manufactured. The method may also include initiating generation of a 2D collaborative model corresponding to the first 2D manufacturing model and initiating storage of the 2D collaborative model on a collaborative data store.

The method may also include detecting changes to the first 2D manufacturing model, propagating the changes to the 2D collaborative model, and propagating the changes to a second 2D manufacturing model edited by a second user. The propagated changes may be manufacturing drawing edits such as defining dimensions, defining tolerances, and entering manufacturing annotations.

It should be noted that references throughout this specification to embodiment features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
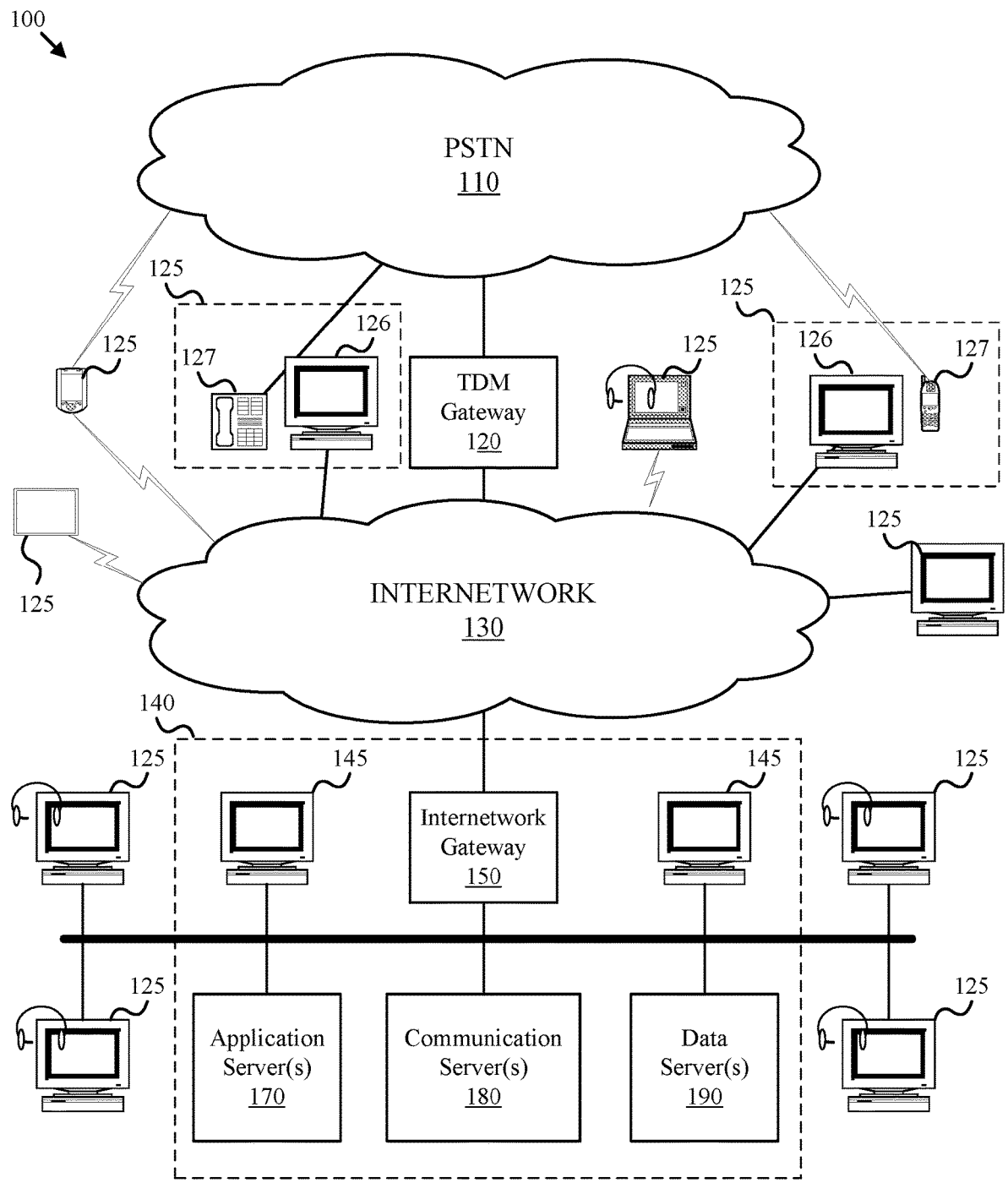
FIG. 1 is a block diagram depicting one example of a computing and communications infrastructure.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices, or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, a compact disk, a digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, the term "dimensioning" generally refers to the process of repeatedly selecting multiple (typically two) reference locations (e.g., points or lines) on a 2D representation of a part that is to be manufactured and the desired relationship (e.g., distance or angle) and the allowable tolerance(s) between the reference locations.

As used herein, the phrase "3D model" generally refers to a three-dimensional electronic representation of one or more parts. To facilitate viewing, a 3D model requires mathematical projections to be rendered on a screen or printed on a sheet of paper.

As used herein, the phrase "2D model" generally refers to a two-dimensional electronic representation of one or more parts. A 2D model can be rendered on a screen or printed on a sheet of paper. As used herein, the phrase "2D drawing" or "manufacturing drawing" refers to a displayed or printed 2D model.

The embodiments disclosed herein recognize that while 3D models are good for designing 3D parts, effective communication to manufacturing personnel typically requires 2D drawings. Furthermore, the dimensions used to model and edit a 3D model are typically different than the dimensions used to specify manufacturing relationships and tolerances on a 2D drawing. The preferred views may also be different.

FIG. 1 is a block diagram of one example of a computing and communications infrastructure 100 that is consistent with one or more embodiments of the claimed invention. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an internetwork gateway 150 connecting a local area network to the internetwork 130, and various servers such as application servers 170, communication servers 180, and data servers 190. The infrastructure 100 is one example of components that can be operably interconnected to provide an infrastructure for a collaborative CAx editing system that facilitates computer-aided design, computer-aided engineering, computer-aided manufacturing, and the like.

Each workstation 125 may include a separate computing device 126 and a communications device 127 or the computing device and communications device may integrated into the workstation 125. Examples of the communications device 127 include a phone, a VOIP device, an instant messaging device, a texting device, a browsing device, or the like. The computing devices 126 may enable graphical viewing, selection, and editing. The communications devices 127 may enable users to communicate with other CAx system users.

The internetwork 130 may facilitate electronic communications between the various workstations and servers. In one embodiment, the internetwork 130 is the internet. In another embodiment, the internetwork 130 is a virtual private network (VPN).

Various servers, such as blade servers, within the data center 140 function cooperatively to facilitate concurrent collaborative editing of CAx models by local and remote users. For example, the application servers 170 may provide one or more CAx applications to the local and remote users. Some users may have the CAx applications installed on their local computing devices 126. Examples of CAx applications include Siemens NX, MSC Nastran, Dessault Systems CATIA and Solidworks, ANSYS, and the like.

The communication servers 180 may facilitate communications between the users through various channels or services such as VOIP services, email services, instant messaging services, short message services, and text messaging services. The workstations 125 may leverage such services for user to user communications via the communication servers 180 or via other available service platforms.

The data servers 190 or the like may store CAx models within various model files or records. The data servers may replicate copies of the models for use by various users. Some users may have a local copy of a model. As described herein, instead of requiring a particular user to assume control of a model file or record, updates to the model may be coordinated by one or more CAx applications including client versions, server versions, and cloud versions of such applications.

As used herein, the phrase "engineering object" generally refers to a conceptual design produced to show the look or function of an object before it is built or made. The design may be incorporated in representations such as plans, drawings, diagrams, schematics, blueprints, sketches, maps, or models. The design may include one or more "features," e.g., attributes of an engineering object and/or operations that receive various parameters and generate one or more geometric elements. For example, an extrude feature may operate on a 2D sketch and generate multiple geometric faces therefrom.

As used herein, the phrase "proprietary representation" generally refers to a data format associated with a CAx application. A proprietary representation of an engineering object may be vendor specific and typically cannot be directly edited by a CAx application other than those available from the vendor or licensed by the vendor. Typically, a conversion process is required for a CAx application from another vendor to edit the engineering object. The conversion process may result in the loss of data.

Figure 2:
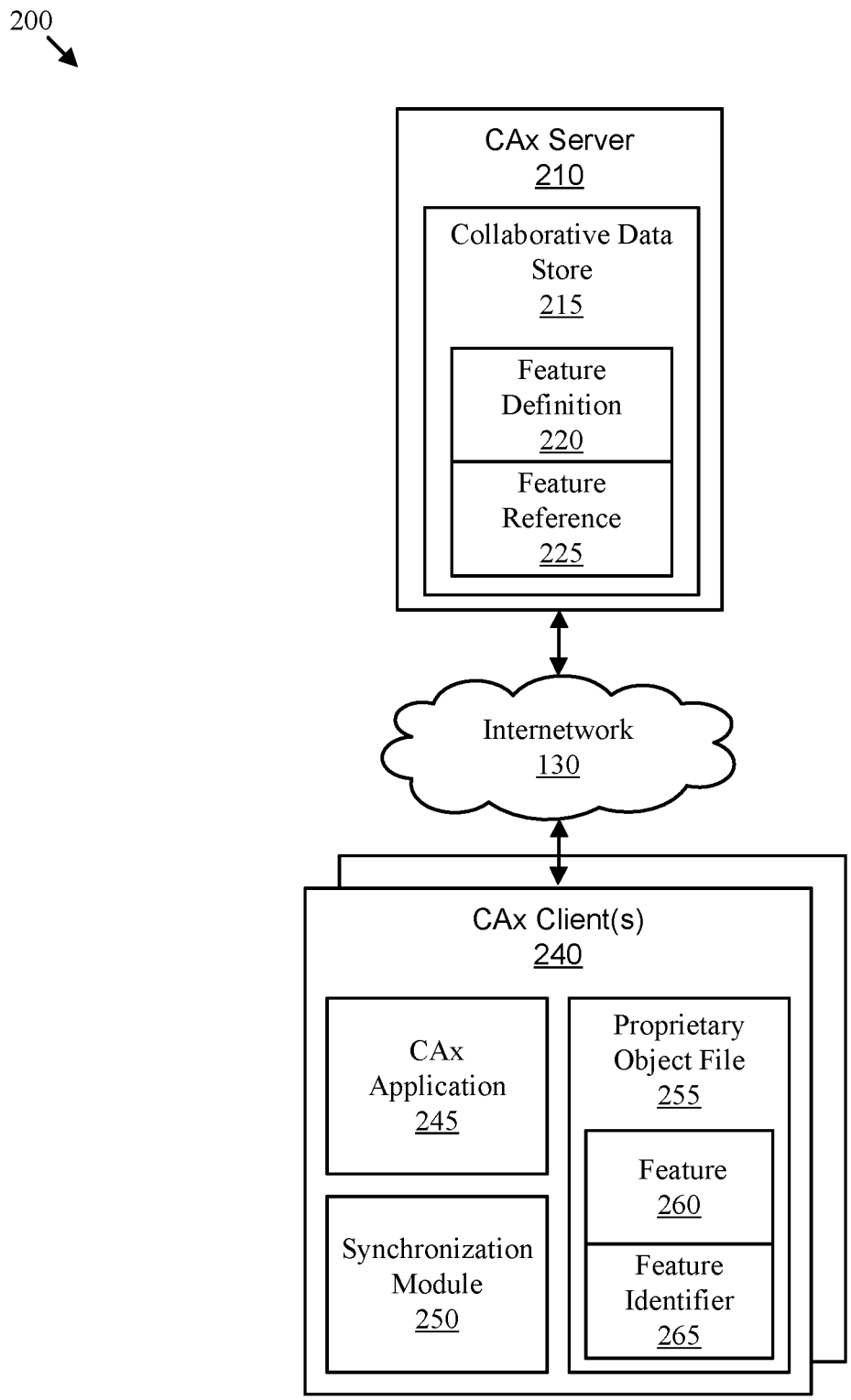
FIG. 2 is a schematic diagram depicting one example of a collaborative CAx editing system.

FIG. 2 is a block diagram of one example of a collaborative CAx editing system 200 that is consistent with one or more embodiments of the claimed invention. As depicted, and as will be explained in greater detail below, the collaborative CAx editing system 200 includes one or more CAx clients 240 with at least one processor configured to execute a proprietary CAx application 245 and enable editing of a model of an engineering object by a user. The model of the engineering object may be encoded in a proprietary format on each client 240 and reside in the proprietary object file 255. The proprietary CAx application 245 and the associated proprietary format of the object file 255 may be different on each client 240.

The collaborative CAx editing system 200 may also include a collaborative CAx server 210 that stores a model of the engineering object within a collaborative data store 215 using a collaborative server format. In one embodiment, the collaborative server format is essentially an operations log. In the depicted embodiment, the collaborative data store 215 is a database. A synchronization module 250 may detect creation of a proprietary feature 260 of the engineering object within the proprietary CAx application 245 and insert a feature identifier 265 corresponding to the feature within the model of the engineering object encoded in the proprietary format and stored in the proprietary object file 255. The feature identifier 265 may correspond to, or be identical to, the feature reference 225. In the depicted embodiment, the synchronization module resides local with the proprietary CAx application 245. However, portions of the synchronization module 250, or a server-side version thereof, may reside on the CAx server 210.

The model of the engineering object managed by the CAx server 210 may include references to features within the various proprietary representations of the engineering object. For example, as depicted in FIG. 2, the feature definition 220, corresponding to the proprietary feature 260 and to the feature identifier 265, may have an associated feature reference 225 associating the feature definition 220 with the proprietary feature 260. In some embodiments, the feature identifier 265 corresponds directly to the feature reference 225. In one embodiment, the feature identifier 265 and the feature reference 225 are identical. The synchronization module 250 may use feature reference 225 to identify the corresponding proprietary feature 260 within the proprietary object file 255 via the feature identifier 265. In one embodiment, the feature reference 225 is a globally-unique identifier (GUID) associated with the proprietary feature 260.

The proprietary object file 255 and the collaborative data store 215 may reside on a single storage device or may be distributed across multiple storage devices. The storage devices may, or may not, be proximate to the CAx client(s) 240 and the CAx server 210. For example, the collaborative data store 215 may represent portions of the computing and communications infrastructure 100 in FIG. 1. Furthermore, each of the depicted modules, such as the CAx application 245 and the synchronization module 250, may reside on a single computing device (i.e. node) or be collaboratively partitioned onto multiple devices or nodes.

Figure 3:
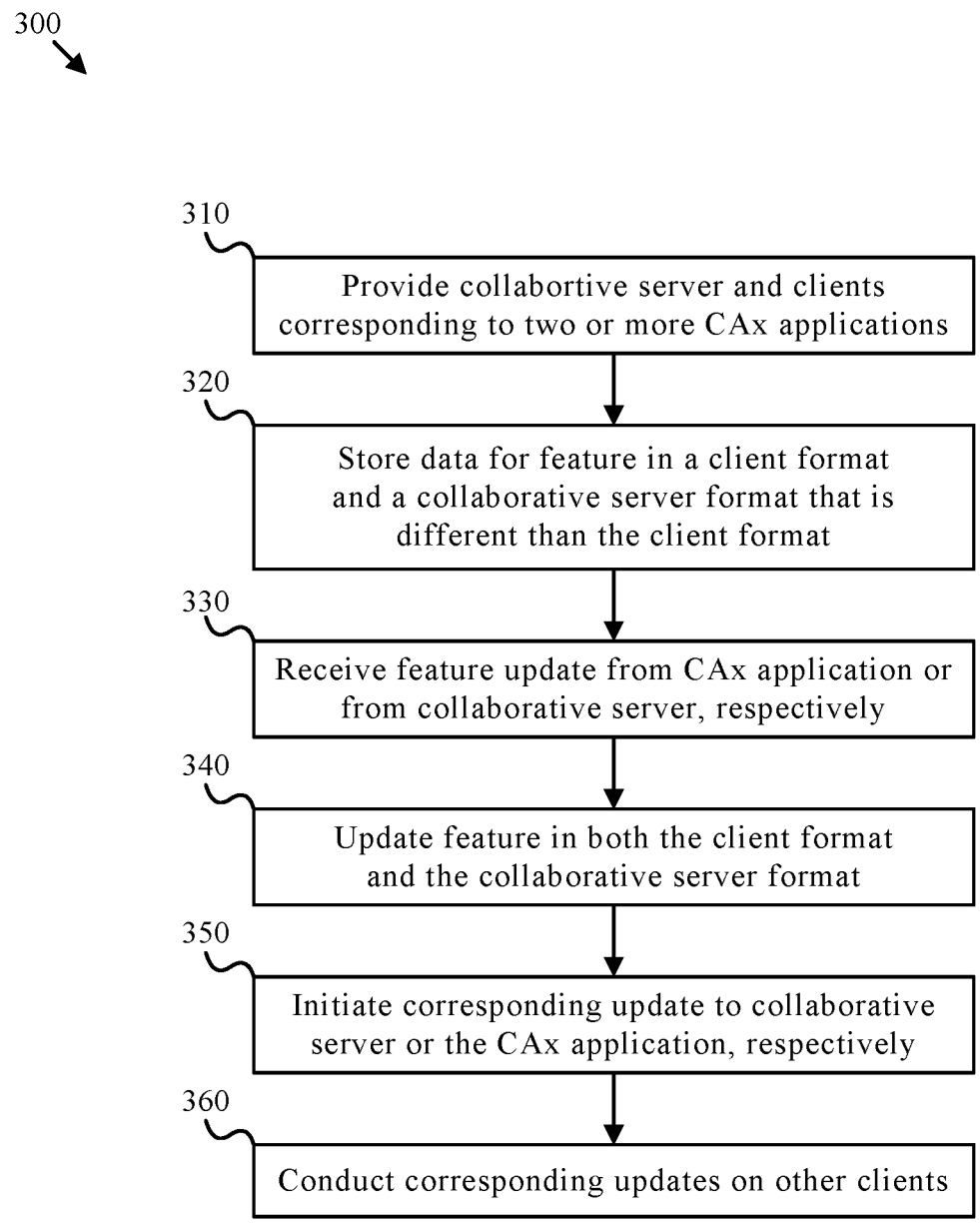
FIG. 3 is a flowchart diagram depicting one example of an update method for collaborative CAx editing.

FIG. 3 is a flowchart diagram of an update method 300 for collaborative CAx editing. As depicted, the update method 300 includes providing (310) a collaborative server and clients, storing (320) data for a feature, receiving (330) a feature update, updating (340) the feature, initiating (350) corresponding updates, and conducting (360) corresponding updates on other clients. The update method 300 may be conducted largely by the synchronization module 250 in conjunction with the CAx application 245 and the CAx server 210.

Providing (310) a collaborative server and clients may include providing the collaborative CAx editing system 200 or the like that provides users working at various client devices the ability to use various (user preferred) proprietary CAx applications. Collaborative use of the proprietary CAx applications may be enabled by the subsequent operations of the update method 300.

Storing (320) data for a feature may include storing data for a feature of an engineering object within a set of memory locations within a storage medium accessible by the synchronization module 250. The data may be stored in the proprietary (i.e., client) format used by CAx application 245. The data may be managed by the synchronization module 250. The data may also be stored in a collaborative server format that used by the CAx server 210. The collaborative server format may be different than the client format. In many embodiments, the collaborative server format is neutral parametric canonical format that provides mathematical definitions of various engineering geometries in a neutral form that is sufficiently fundamental to enable translation to a wide variety of client formats.

Receiving (330) a feature update may include receiving notification of an update to a feature by the CAx application 245. Receiving (330) a feature update may also include receiving an update message from the CAx server 210 that references the feature.

In response to receiving (330) a feature update, the method continues by updating (340) the feature within the set of memory locations within the storage medium accessible by the synchronization module 250. Both the proprietary (i.e., client) representation, used by the CAx application 245, and the collaborative server representation, used by the collaborative server 210, may be updated with the storage medium accessible by the synchronization module 250. Updating both representations enables synchronization of the CAx server 210 and the CAx application 245.

Initiating (350) corresponding updates, may include updating the party that was not the source of the feature update. For example, if the update was received from the CAx server 210, the corresponding update to the CAx application 245 may be initiated. In one embodiment, the feature is updated on the CAx application 245 via an API provided by the CAx application 245. The API may be leveraged by the synchronization module 250 to find the feature using a feature identifier and then update the feature. Conversely, if the feature update was received from the CAx application 245, the corresponding update to the CAx server 210 may be initiated by sending a feature update request to the CAx server. The CAx server 210 may update and save the feature for subsequent use.

Conducting (360) corresponding updates on other clients may include the CAx server 210 sending update messages to other clients that are editing the model of the engineering object. The other clients may have CAx applications 245 with various client formats including proprietary formats.

As used herein, the phrase "feature identifier" generally refers to a data item that relates a proprietary feature in a proprietary object file to a feature definition in a collaborative database. In one embodiment, the feature identifier is the index of the feature definition record in the collaborative database.

In one embodiment, the feature identifier is stored in a parameter for the feature within the proprietary representation of the engineering object. By storing the feature identifier within the proprietary representation of the engineering object, the relationship between the proprietary feature and the corresponding feature definition within the CAx server 210 is persistent between editing sessions on the CAx client. The feature identifier may be a globally unique identifier. In some embodiments, the feature identifier is represented in a text format to facilitate storage and retrieval within various CAx applications.

Figure 4:
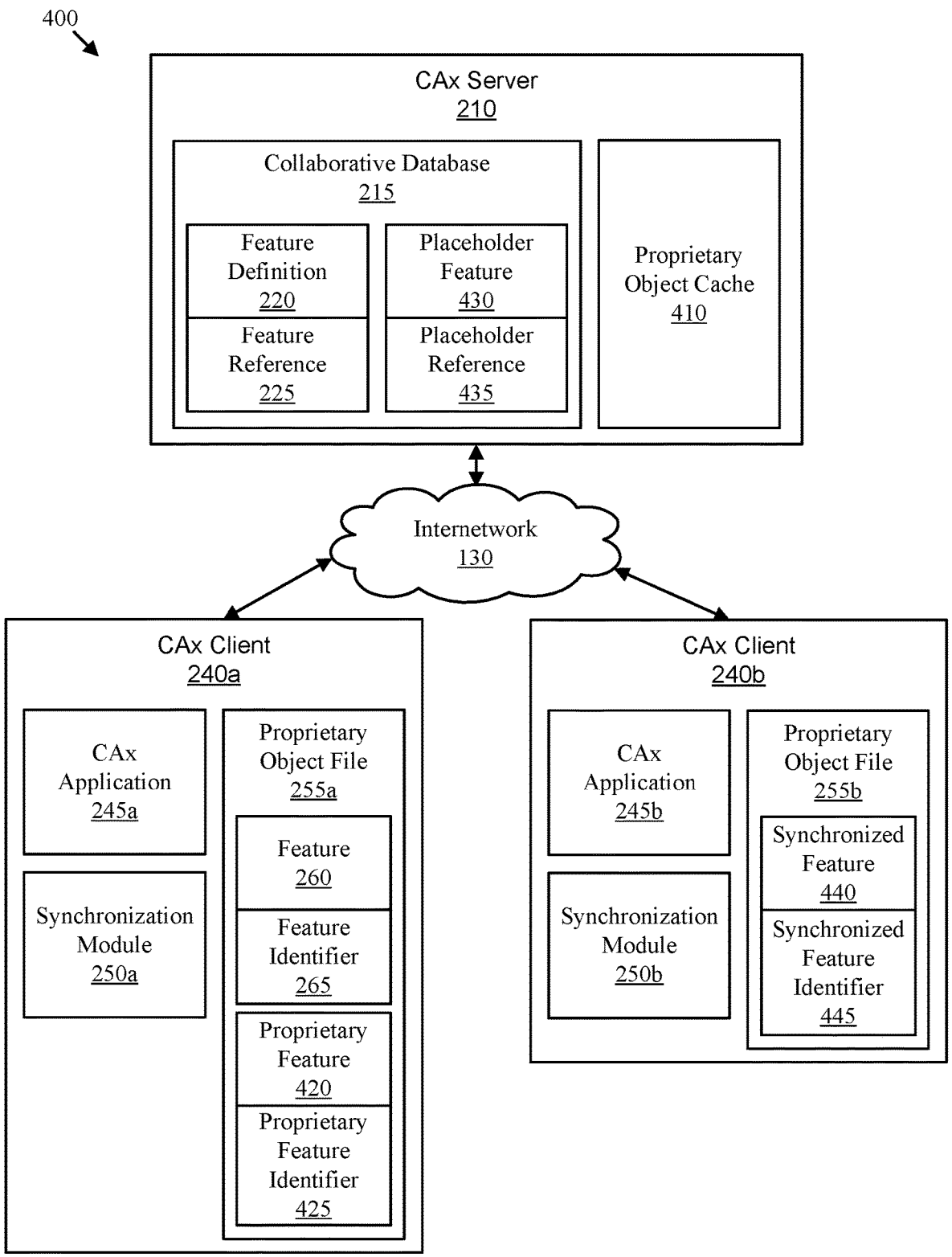
FIG. 4 is a schematic diagram depicting one example of a collaborative CAx editing system.

FIG. 4 is a schematic diagram of one example of a collaborative CAx editing system 400 that is consistent with one or more embodiments of the claimed invention. In addition to the internetwork 130 of the computing and communications infrastructure 100 of FIG. 1, and modules of the collaborative CAx editing system 200 of FIG. 2, collaborative CAx editing system 400 includes a second CAx client. Corresponding modules of the two CAx clients 240 are appended with reference letters 'a' and 'b.'

In one embodiment, the client representation(s) and the collaborative server representations may be cached by the collaborative CAx server. For example, as part of collaborative CAx editing system 400 in FIG. 4, CAx server 210 may cache the proprietary representation of the engineering object in proprietary object cache 410. Regenerating a proprietary representation of an engineering object from the CAx server may be a relatively computationally-intensive and time-consuming process. Caching the client representation(s) of the engineering object on the CAx server with the collaborative server representation may accelerate the loading of the engineering object on a CAx client on which the proprietary representation is usable by the CAx client and has not yet been loaded into memory (such as following a system crash of the CAx client, or when a new CAx client is added to the collaborative editing system).

In one embodiment, a client representation of the engineering object may be provided to another (a second) CAx client. When the second CAx client adds or changes a feature in the client representation, an instance of the synchronization module corresponding to the second client may communicate the feature identifier and a corresponding feature definition to the CAx server. The synchronization module (associated with the first CAx client) may then receive a feature identifier and the feature definition corresponding to the feature created on the second CAx client and create a corresponding local feature. For example, as part of collaborative CAx editing system 400, synchronization module 250a on CAx client 240a may create feature definition 220 in collaborative database 215 on CAx server 210. CAx server 210 may notify synchronization module 250b on CAx client 240b of the new feature in the collaborative database 215. Synchronization module 250b, on CAx client 240b, may then create synchronized feature 440 and synchronized feature identifier 445 in proprietary object file 255b. Consequently, synchronized feature 440 and synchronized feature identifier 445 on CAx client 240b are synchronized to feature 260 and feature identifier 265 in proprietary object file 255a on CAx client 240a.

In some embodiments, the CAx synchronization module may initiate insertion of a placeholder feature and corresponding feature reference within the collaborative server representation of the engineering object for features not directly supported by the collaborative server representation of the engineering object. For example, as depicted in collaborative editing system 400 in FIG. 4, proprietary feature 420 with proprietary feature identifier 425 may be created in proprietary object file 255a on CAx client 240a. Synchronization module 250a may initiate creation of placeholder feature 430 and associated placeholder reference 435 in collaborative database 215 on CAx server 210. Features represented by a placeholder may not be editable by another CAx application, but the placeholder reference 435 maintains an association between the database record for placeholder feature 430 and the proprietary representation of the data in the proprietary object file 255a. Placeholder features may be referenced by other features. For example, a sheet body that could not be created or edited in collaborative database 215 may be represented by a placeholder feature and referenced by a split body feature.

As explained above, the collaborative CAx system may associate features in a proprietary (i.e., client) representation of an engineering object with corresponding feature definitions in a collaborative server representation of the engineering object. A synchronization module, which may be a plug-in to a CAx application executing on a CAx client, may synchronize features between the proprietary and collaborative server representations of the engineering object. For example, as new features are created and edited on one CAx client and synchronized to a vendor-neutral database, synchronization modules on other CAx clients may synchronize the features from the vendor-neutral database to local copies of the model of the engineering object. The local copies of the model may be encoded in the same proprietary format or a different proprietary format.

The collaborative CAx editing system may maintain identifiers and references associating the proprietary and collaborative server representations of features of the engineering object in non-transitory storage, to prevent the loss of data in the event of system failure of either a CAx client or the CAx server. The feature identifiers help maintain data consistency within the various instances of the model of the engineering object. In some embodiments, additional or other data consistency techniques, such as geometry identifiers or geometry identification, may be applied such as those disclosed in commonly assigned co-pending U.S. patent application Ser. No. 14/185,823 entitled "SYSTEM AND METHODS FOR MULTI-USER CAX EDITING DATA CONSISTENCY" and filed on 20 Feb. 2014, which application is incorporated herein by reference.

Figure 5:
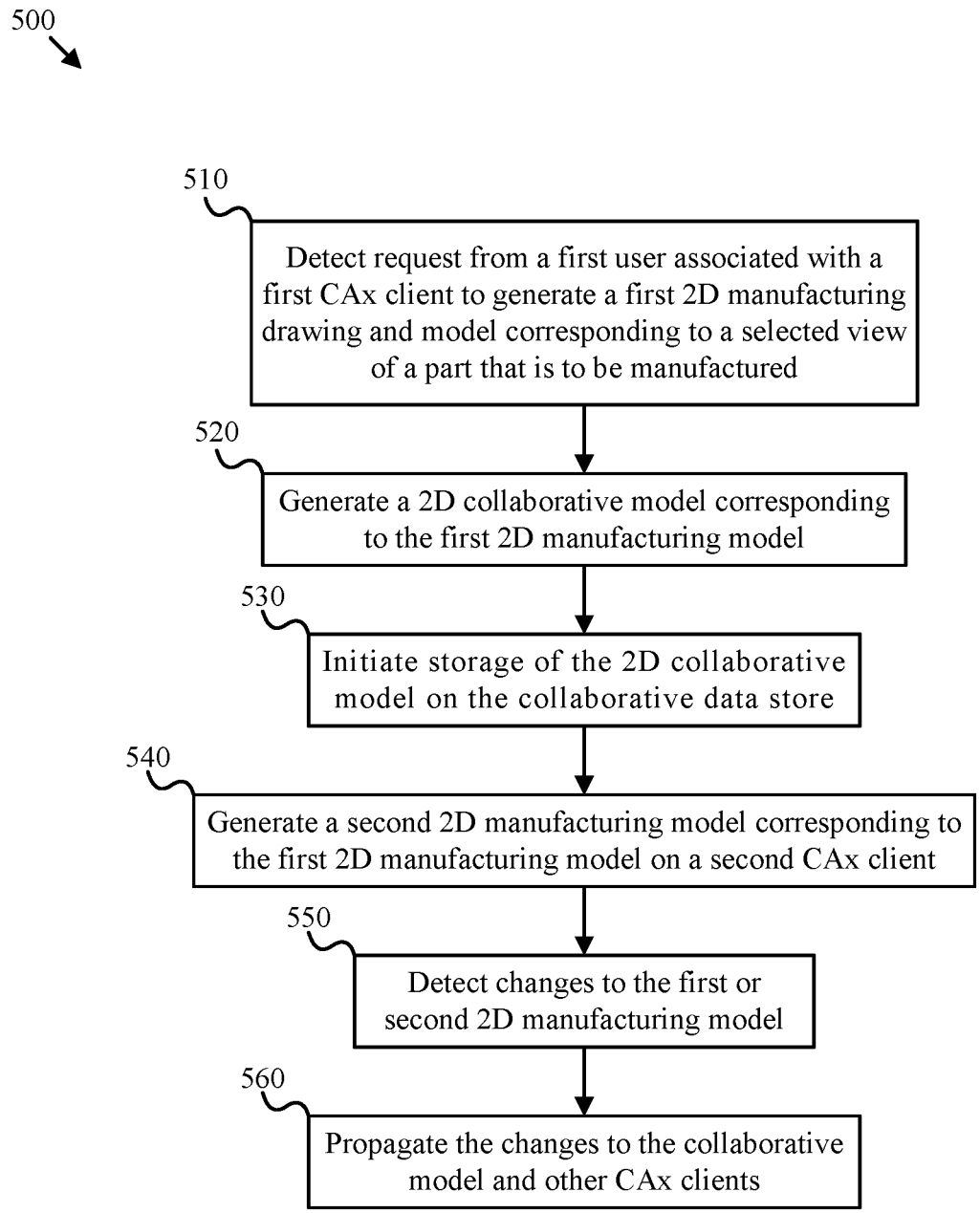
FIG. 5 is a flowchart diagram depicting one example of a method for collaborative editing of manufacturing drawings.

FIG. 5 is a flowchart diagram depicting one example of a method 500 for collaborative editing of manufacturing drawings. As depicted the method 500 includes detecting (510) a request from a first user associated with a first CAx client to generate a first 2D manufacturing model, generating (520) a 2D collaborative model, initiating (530) storage of the 2D collaborative model on a collaborative data store, generating (540) a second 2D manufacturing model, detecting (550) changes to the first or second 2D manufacturing model, and propagating (560) the changes to the collaborative model and other CAx clients.

The depicted method may be used in conjunction with the collaborative CAx editing system 400 or similar system that includes a collaborative data store configured to store a 3D collaborative model. The 3D collaborative model may be encoded in a collaborative server format and may comprise a plurality of features for a part that is to be manufactured. The system may also include a collaborative server (e.g., 210) configured to manage the collaborative data store and multiple CAx clients (e.g., 240), as well as a synchronization module 250 or the like. The CAx clients may be configured to execute various proprietary CAx applications. In some embodiments, at least some of the synchronization modules are plugin modules for the proprietary CAx applications that execute on the CAx clients. The various synchronization modules enable multi-user CAx editing using various proprietary CAx applications that may not inherently support concurrent multi-user editing.

Detecting (510) a request may include detecting a request from a first user associated with a first CAx client to generate a first 2D manufacturing model. The request may occur when the first user is viewing or editing a first 3D proprietary model with a first CAx application. The first 3D proprietary model may be encoded in a first CAx format that is different than the format used by the collaborative server. The request from the first user may be inherent with a request to generate a first 2D manufacturing drawing through which the first user desires to specify manufacturing dimensions and tolerances and enter annotations (e.g., with instructions for manufacturing). The request may correspond to a view, selected by the first user, of a part modeled by the first 3D proprietary model and displayed by the first CAx application. The request may result in the first CAx application generating the first 2D manufacturing model.

The first 2D manufacturing model may be encoded in the first CAx format (which is natively used by the first CAx application). In some embodiments, the first 2D manufacturing model is augmented to, or embedded within, the first 3D proprietary model. In other embodiments, the first 2D manufacturing model is stored in a file separate from the first 3D proprietary model. In some embodiments, the 2D manufacturing model is rendered to, and edited by the user in, a window that is separate from 3D editing and viewing windows. In other embodiments, the 2D manufacturing model is rendered on a (editing) plane within the displayed 3D model. In such embodiments, a 2D editing mode may be activated in the CAx application during which 3D viewing features are still accessible but 3D editing features, including the insertion of model geometries, are blocked.

Generating (520) a 2D collaborative model may include generating a 2D collaborative model that corresponds to the first 2D manufacturing model. In some embodiments, the 2D collaborative model is generated by converting each geometry and feature within the first 2D manufacturing model to a neutral 2D canonical format used by the collaborative server. Initiating (530) storage of the 2D collaborative model on a collaborative data store may occur by sending the 2D collaborative model to the collaborative server and/or saving the 2D collaborative model to the collaborative data store.

Generating (540) a second 2D manufacturing model may include converting the 2D collaborative model to a second 2D manufacturing model useable by a second CAx client. The second 2D manufacturing model may be encoded in a second CAx format that is different than the format used by the collaborative server and the format used by the second CAx application. The second CAx format may be natively used by a second CAx application executing on the second CAx client. In some embodiments, the second 2D manufacturing model is generated by a synchronization plugin module for the second CAx application.

Detecting (550) changes to the first or second 2D manufacturing model may include the synchronization modules 250 on the CAx clients 240 detecting edits to the (synchronized) first and second 2D manufacturing models. Subsequently, the method continues by propagating (560) the changes to the collaborative model and to each other as well as other CAx clients. In some embodiments, the changes are propagated via the collaborative server 210. The propagated changes may be manufacturing drawing edits such as defining dimensions, defining tolerances, and entering manufacturing annotations.

The various elements of the collaborative CAx system, methods, and apparatus function cooperatively to facilitate productive, collaborative CAx editing, including collaborative editing of 2D manufacturing drawings. The preceding depiction of the collaborative CAx system and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a collaborative data store configured to store a 3D collaborative model comprising a plurality of features for a part that is to be manufactured, wherein the 3D collaborative model is encoded in a collaborative server format;
   a collaborative server configured to manage the collaborative data store;
   a first computer aided technology (CAx) client comprising at least one processor and configured to execute a first CAx application and enable a first user to edit or view a first 3D proprietary model wherein the first 3D proprietary model is encoded in a first CAx format that is different than the collaborative server format;
   a second computer aided technology (CAx) client comprising at least one processor and configured to execute a second CAx application and enable a second user to edit or view a second 3D proprietary model wherein the second 3D proprietary model is encoded in a second CAx format that is different than the first CAx format and the collaborative server format;
   one or more synchronization modules configured to execute on at least one of the first CAx client, the second CAx client, and the collaborative server, the one or more synchronization modules configured to synchronize the collaborative model with the first 3D proprietary model in response to updates to at least one of the first 3D proprietary model, the second 3D proprietary model, and the 3D collaborative model;
   wherein the one or more synchronization modules are further configured to detect a request from the first user to generate a first 2D manufacturing drawing and model corresponding to a selected view of the part that is to be manufactured;
   wherein the one or more synchronization modules are further configured to generate, responsive to the request from the first user, the first 2D manufacturing model and a 2D collaborative model corresponding to the first 2D manufacturing model and initiate storage of the 2D collaborative model on the collaborative data store;
   wherein the first 2D manufacturing model is distinct from the first 3D proprietary model, the second 3D proprietary model, and the 3D collaborative model; and
   wherein the first 2D manufacturing drawing and model enable the user to specify and update manufacturing dimensions and tolerances without updating any of the first 3D proprietary model, the second 3D proprietary model, and the 3D collaborative model.

2. The system of claim 1, wherein the one or more synchronization modules are further configured to generate a second 2D manufacturing model corresponding to the first 2D manufacturing model on the second CAx client.

3. The system of claim 2, wherein the one or more synchronization modules are further configured to detect changes to the first 2D manufacturing model and propagate the changes to the 2D collaborative model.

4. The system of claim 3, wherein the one or more synchronization modules are further configured to propagate the changes to the second 2D manufacturing model.

5. The system of claim 3, wherein the changes to the first 2D manufacturing model comprise at least one of defining a dimension, defining a tolerance, and entering an annotation.

6. The system of claim 1, wherein the 2D collaborative model is embedded within the 3D collaborative model or stored separately from the 3D collaborative model.

7. The system of herein the first 2D manufacturing model is embedded within the first 3D proprietary model or stored separately from the first 3D proprietary model.

8. The system of claim 1, wherein the one or more synchronization modules are further configured to synchronize the first 3D proprietary model and the second 3D proprietary model with the 3D collaborative model in response to insertion of the 2D model data within the 3D collaborative model.

9. The system of claim 1, wherein the first 2D manufacturing model conforms to the first CAx format.

10. The system of claim 2, wherein the second 2D manufacturing model conforms to the second CAx format.

11. The system of claim 1, wherein the request to generate the first 2D manufacturing model comprises a request to generate a 2D drawing corresponding to the selected view of the part that is to be manufactured.

12. The system of claim 1, wherein the selected view of the part that is to be manufactured is selected by the first user.

13. The system of claim 1, wherein the one or more synchronization modules comprise a plugin module for the first CAx application or the second CAx application.

14. The system of claim 1, wherein the first CAx format or the second CAx format is selected from the group consisting of an AutoCAD format, a CATIA format, an NX format, and a Solidworks format.

15. A method, executed by at least one processor, the method comprising:
    executing a first CAx application configured to enable a first user to edit or view a first 3D proprietary model comprising a plurality of features for a part that is to be manufactured, wherein the 3D proprietary model is encoded in a first CAx format;
    executing a synchronization plugin module for the first CAx application,
    detecting, with the synchronization plugin module, a request by the first user to generate a first 2D manufacturing drawing and model corresponding to a selected view of the part that is to be manufactured;
    initiating generation of the first 2D manufacturing drawing and model responsive to the request by the first user;
    initiating generation of a 2D collaborative model corresponding to the first 2D manufacturing model subsequent to the request by the first user;
    initiating storage of the 2D collaborative model on a collaborative data store subsequent to the request by the first user;
    wherein the first 2D model is distinct from the first 3D proprietary model, the second 3D proprietary model, and the 3D collaborative model; and
    wherein the first 2D manufacturing drawing and model enable the user to specify and update manufacturing dimensions and tolerances without updating any of the first 3D proprietary model, the second 3D proprietary model, and the 3D collaborative model.

16. The method of claim 15, further comprising initiating generation of a second 2D manufacturing model corresponding to the first 2D manufacturing model on a second CAx client.

17. The method of claim 15, further comprising detecting changes to the first 2D manufacturing model and propagating the changes to the 2D collaborative model.

18. The method of claim 17, further comprising propagating the changes to a second 2D manufacturing model edited by a second user.

19. The method of claim 17, wherein the changes to the first 2D manufacturing model comprise at least one of defining a dimension, defining a tolerance, and entering an annotation.

20. The method of claim 15, wherein the 2D collaborative model is embedded within the 3D collaborative model or stored separately from the 3D collaborative model.

21. The method of claim 15, wherein the first 2D manufacturing model is embedded within the first 3D proprietary model or stored separately from the first 3D proprietary model.

22. A computer-readable medium that is not a transitory signal per se having one or more computer-executable instructions stored thereon that, when executed by a computing device, cause the computing device to conduct a method comprising:

executing a first CAx application configured to enable a first user to edit or view a first 3D proprietary model comprising a plurality of features for a part that is to be manufactured, wherein the 3D collaborative model is encoded in a first CAx format;

executing a synchronization plugin module for the first CAx application, detecting, with the synchronization plugin module, a request by the first user to generate a first 2D manufacturing drawing and model corresponding to a selected view of the part that is to be manufactured;

initiating generation of the first 2D manufacturing drawing and model responsive to the request by the first user;

initiating generation of a 2D collaborative model corresponding to the first 2D manufacturing model subsequent to the request by the first user;

initiating storage of the 2D collaborative model on a collaborative data store subsequent to the request by the first user;

wherein the first 2D manufacturing model is distinct from the first 3D proprietary model, the second 3D proprietary model, and the 3D collaborative model; and wherein the first 2D manufacturing drawing and model enable the user to specify and update manufacturing dimensions and tolerances without updating any of the first 3D proprietary model, the second 3D proprietary model, and the 3D collaborative model.

\* \* \* \* \*